United States Patent
Tsirkin et al.

(10) Patent No.: US 11,221,868 B2
(45) Date of Patent: Jan. 11, 2022

(54) SECURITY ENHANCED HYPERVISOR USERSPACE NOTIFICATIONS

(71) Applicant: Red Hat, Inc., Raleigh, NC (US)

(72) Inventors: Michael Tsirkin, Lexington, MA (US); Paolo Bonzini, Milan (IT)

(73) Assignee: Red Hat, Inc., Raleigh, NC (US)

( * ) Notice: Subject to any disclaimer, the term of this patent is extended or adjusted under 35 U.S.C. 154(b) by 106 days.

(21) Appl. No.: 16/823,748

(22) Filed: Mar. 19, 2020

(65) Prior Publication Data

US 2020/0218563 A1 Jul. 9, 2020

Related U.S. Application Data

(63) Continuation of application No. 15/924,760, filed on Mar. 19, 2018, now Pat. No. 10,606,631.

(51) Int. Cl.
*G06F 9/455* (2018.01)

(52) U.S. Cl.
CPC ........ *G06F 9/45558* (2013.01); *G06F 9/4555* (2013.01); *G06F 2009/45579* (2013.01); *G06F 2009/45587* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 8,719,546 B2 | 5/2014 | Lu | |
| 9,658,878 B2 | 5/2017 | Ports et al. | |
| 9,697,027 B1 | 7/2017 | Hazra et al. | |
| 9,747,172 B2 | 8/2017 | Epstein | |
| 2015/0128215 A1 | 5/2015 | Son | |
| 2016/0306966 A1 | 10/2016 | Srivastava et al. | |
| 2018/0114013 A1* | 4/2018 | Sood | ..................... G06F 21/572 |
| 2019/0018800 A1* | 1/2019 | Jayasena | ............. G06F 12/1441 |

FOREIGN PATENT DOCUMENTS

CN 103793645 5/2014

OTHER PUBLICATIONS

Shi, Lei, "Deconstructing Xen", Shanghai Key Laboratory of Scalable Computing and Systems, Shanghai Jiao Tong University; Institute of Parallel and Distributed Systems, Department of Computer and Information Sciences, University of Pennsylvania; Huawei Technologies, Inc., Feb. 26-Mar. 1, 2017, 15 pages.
"Excessive Checking in Compatibility Mode Hypercall Argument Translation", https://vulners.com/xen/XSA-111, Nov. 27, 2014, 3 pages.

\* cited by examiner

*Primary Examiner* — Charlie Sun
(74) *Attorney, Agent, or Firm* — Lowenstein Sandler LLP

(57) ABSTRACT

Systems and methods for enabling a user space process of a guest operating system to initiate hardware operations in a security-enhanced manner. An example method may comprise: configuring a storage unit to store resource requests of one or more user space processes, wherein the storage unit is accessible to a hypervisor and to a user space process managed by a guest operating system; determining, by a processing device, that the user space process managed by the guest operating system is authorized to store a resource request at the storage unit; and receiving, by the hypervisor, a signal from the user space process, wherein the signal is associated with the storage unit and initiates execution of the resource request.

20 Claims, 6 Drawing Sheets

SECURITY ENHANCED HYPERVISOR USERSPACE NOTIFICATIONS

RELATED APPLICATIONS

The present application is a continuation of application Ser. No. 15/924,760, filed Mar. 19, 2018, entitled "Security Enhanced Hypervisor Userspace Notifications" which is incorporated by reference herein.

TECHNICAL FIELD

The present disclosure is generally related to virtualization in a computing environment, and more particularly, to virtualization technology that enables communication between different portions of a virtualized computer system in a security-enhanced manner.

BACKGROUND

Virtualization allows multiplexing of an underlying host machine between different virtual machines. The host machine allocates a certain amount of its storage resources to each of the virtual machines. Each virtual machine is then able to use the allocated storage resources to execute applications, including operating systems (referred to as guest operating systems). Executable code that provides the virtualization is commonly referred to as a hypervisor (also known as a virtual machine monitor (VMM)). The hypervisor emulates the underlying hardware of the host computer, making the use of the virtual machine transparent to the guest operating system and the user of the computer.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
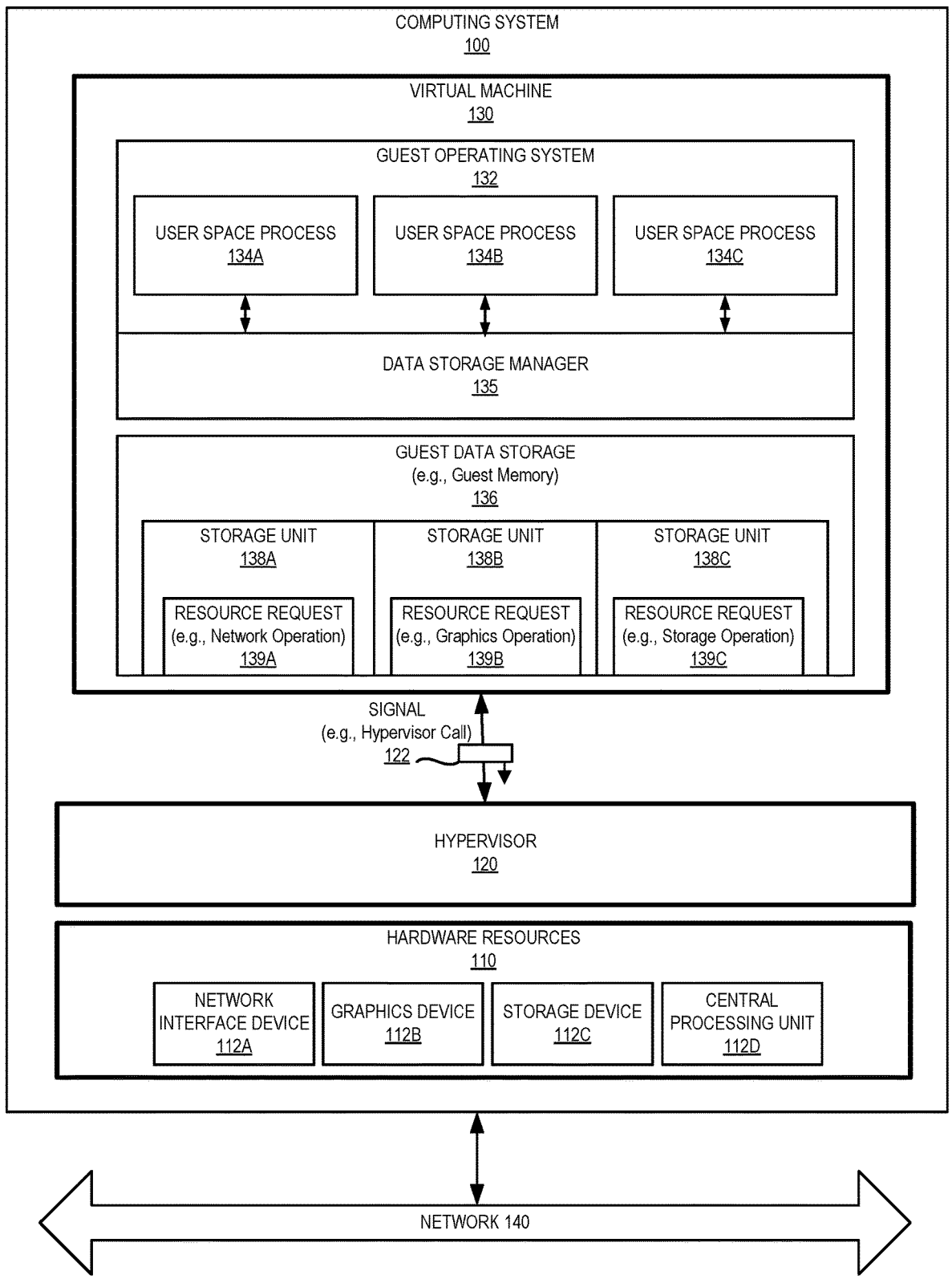
FIG. 1 depicts a high-level block diagram of an example computing system that enables a guest user space process to communicate resource requests with a hypervisor in a security enhanced manner, in accordance with one or more aspects of the present disclosure.

Modern computer systems often include virtualization technology that supports paravirtualization to further optimize the use of underlying hardware resources. Paravirtualization may be a virtualization technique that enables a guest operating system to be aware of the underlying virtualization technology and to communicate with the underlying virtualization technology (e.g., hypervisor). Paravirtualization may provide a communication interface to a guest operating system that enables the guest operating system to communicate with a hypervisor using hypercalls (e.g., hypervisor calls). The hypercalls may enable guest code executed by the virtual machine to initiate communication with the hypervisor. The guest code may include one or more guest operating systems, applications, drivers, other executable code, or a combination thereof. The hypercalls may provide an efficient communication channel with the hypervisor but may not provide the level of security preferred by some computing environments. As a result, computing environments may be encouraged to restrict the use of hypercalls by user space processes, which may reduce the ability of the user space processes to benefit from the more efficient communication channel provided by hypercalls.

Aspects of the present disclosure address the above and other deficiencies by providing technology that enables a user space process to use hypercalls to initiate hardware operations in a security enhanced manner. The technology may supplement hypercalls with native data storage security mechanisms. For example, a guest operating system may configure a storage unit to be accessible by a particular user space process managed by the guest operating system. The storage unit may be used by the user space process to store one or more resource requests. The resource requests may include one or more hardware operations and may be interpreted by a hypervisor. When the user space process stores a resource request at the storage unit, the underlying processing device may perform a security check to ensure the user space process is authorized to store data at the storage unit. The user space process may then transmit to the hypervisor a signal (e.g., by executing a hypercall) that is associated with storage unit having the resource request. The hypervisor may retrieve the resource request from the storage unit and process the resource request. In one example, a kernel of a guest operating system may configure multiple storage units and each storage unit may correspond to a particular hardware resource of a set of hardware resources (e.g., network controller, graphics controller, storage device controller). The kernel may provide one or more user space processes with access to the one or more storage units to provide the users space processes with access to the respective hardware resources.

The systems and methods described herein include technical improvements to virtualization technology. In particular, aspects of the present disclosure may enhance the security of communications between a guest user space process and the hypervisor by incorporating data storage security checks with user space process signals (e.g., via hypercalls). For example, the user space process may provide via a storage unit a request for a hardware operation to the hypervisor. The user space process may undergo a security check when storing the request at the storage unit and the hypervisor may retrieve the request after the security check has been performed. In addition, aspects of the present disclosure may enable a guest operating system to control which guest user space processes have access to which hardware resources by controlling which storage units are accessible by the user space processes. The use of the storage units to broker resource requests enables a guest operating system to control a user space process's access to hardware resources without the overhead of brokering each individual resource request communicated between the user space process and the hypervisor.

Various aspects of the above referenced methods and systems are described in details herein below by way of examples, rather than by way of limitation. The examples provided below discuss a virtualized computer system where the user space processes are managed by aspects of a virtual machine, a hypervisor, a host operating system, or a combination thereof. In other examples, the user space processes are managed by a computing system that uses other forms of virtualization (e.g., operating-system-level virtualization) and may be absent the hypervisor discussed below.

FIG. 1 depicts an illustrative architecture of elements of a computing system 100, in accordance with an embodiment of the present disclosure. Computing system 100 may include hardware resources 110, a hypervisor 120, a virtual machine 130, a guest operating system 132, one or more user space processes 134A-C, and a network 140. It should be noted that other architectures for computing system 100 are possible, and that the implementations of the computing system utilizing embodiments of the disclosure are not necessarily limited to the specific architecture depicted.

Computing system 100 may be a single computing machine or multiple computing machines arranged in a homogenous or heterogeneous group (e.g., cluster, grid, server farm). Computing system 100 may include one or more rack mounted servers, workstations, desktop computers, notebook computers, tablet computers, mobile phones, palm-sized computing devices, personal digital assistants (PDAs), etc. In one example, computing system 100 may be a computing device implemented with x86 hardware. In another example, computing system 100 may be a computing device implemented with PowerPC®, SPARC®, other hardware, or a combination thereof. In either example, computing system 100 may include one or more hardware resources 110.

Hardware resources 110 may provide hardware features for performing computing tasks. In one example, one or more of the hardware resources may correspond to a physical device of computing system 100. In another example, one or more of the hardware resources may be provided by hardware emulation and the corresponding physical device may be absent from computer system. For example, computing system 100 may be a server machine that does not include a graphics device (e.g., graphics card) or includes a graphics device that does not support a particular hardware feature. Hypervisor 120 may provide the hardware feature of the hardware resource by emulating a portion of the hardware resource (e.g., provide a virtualized graphics device). The emulation of a portion of a hardware resource may be provided by hypervisor 120, virtual machine 130, host operating system (not shown), another hardware resource, or a combination thereof.

Hardware resources 110 may include a network interface device 112A, a graphics device 112B, a storage device 112C, central processing unit 112D, other physical or emulated devices, or combination thereof. Network interface device 112A may provide access to a network internal to the computing system 100 or external to the computing system 100 (e.g., network 140) and in one example may be a network interface controller (NIC). Graphics device 112B may provide graphics processing for the computing system 100 and/or one or more of the virtual machines 130. Storage device 112C may include any data storage that is capable of storing digital data, such as physical memory devices including volatile memory devices (e.g., RAM), non-volatile memory devices (e.g., NVRAM), other types of memory devices, or a combination thereof. Storage device 112C may include mass storage devices, such as solid-state storage (e.g., Solid State Drives (SSD)), hard drives, other persistent data storage, or a combination thereof. Central processing unit 112D may refer to devices capable of executing instructions encoding arithmetic, logical, or I/O operations. Central processing unit 112D may be a single core processor, which may be capable of executing one instruction at a time (e.g., single pipeline of instructions) or a multi-core processor, which may simultaneously execute multiple instructions. One or more of the hardware resources 110 may be combined or consolidated into one or more physical devices or may partially or completely emulated by hypervisor 120 as a virtual device.

Hypervisor 120 may also be known as a virtual machine monitor (VMM) and may provide virtual machine 130 with access to one or more features of the underlying hardware resources 110. In the example shown, hypervisor 120 may run directly on the hardware of computing system 100 (e.g., host machine). In other examples, hypervisor 120 may run on or within a host operating system (not shown). Hypervisor 120 may manage system resources, including access to hardware resources 110. Hypervisor 120, though typically implemented as executable code, may emulate and export a bare machine interface to higher-level executable code in the form of virtual processors and guest memory. Higher-level executable code may comprise a standard or real-time operating system (OS), may be a highly stripped down operating environment with limited operating system functionality and may not include traditional OS facilities, etc. Hypervisor 120 may support any number of virtual machines (e.g., a single VM, one hundred VMs, etc.).

Virtual machine 130 may execute guest executable code based on an underlying emulation of the hardware resources. Virtual machine 130 may support, for example, hardware emulation, full virtualization, para-virtualization, operating system-level virtualization, other virtualization technology, or a combination thereof. The guest executable code may include a guest operating system 132 that manages the execution of one or more user space processes 134A-C. Virtual machine 130 may include a guest operating system 132, which may include one or more of Microsoft® Windows®, Linux®, Solaris®, or other operating system.

Guest operating system 132 may include a data storage manager 135 that manages portions of guest data storage 136. Guest data storage 136 may be a portion of data storage that is allocated by hypervisor 120 for use by virtual machine 130. Data storage manager 135 may configure and manage access to different portions of guest data storage 136. Data storage manager 135 may segregate guest data storage 136 into multiple portions that are associated with different access privileges. At least one of the multiple portions may be associated with enhanced privileges and may be accessed by processes with enhanced privileges (e.g., kernel mode, kernel privilege) and another portion may be associated with diminished privileges and may be accessed by processes with diminished privileges (e.g., user space mode, user space privilege) as well as processes with enhanced privileges. In one example, the portion of guest data storage 136 associated with the enhanced privileges may be designated as kernel space and the portion of guest data storage 136 associated with the diminished privileges may be designated as user space. In other examples, there may be more or less than two portions of guest data storage 136.

Guest operating system 132 may manage the execution of one or more computing processes. A computing process may comprise one or more streams of execution for executing programmed instructions. The stream of instructions may include a sequence of instructions that can be executed by one or more processing devices. A computing process may be managed by a kernel or may be a part of kernel (not shown). In one example, a computing process may be an instance of a computer program that is being executed and may contain executable program code and a state of the current activity. Multiple computing processes may be executed concurrently by a processing device that supports multiple processing units. The processing units may be provided by multiple processors or from a single processor with multiple cores or a combination thereof. A computing process may include one or more computing threads, such as a system thread, user thread, or fiber, or a combination thereof. A computing process may include a thread control block, one or more counters and a state (e.g., running, ready, waiting, start, done).

Computing processes may be associated with a particular level of privilege and each computing process may have a similar level of privilege or they may have different levels of privilege. The privilege levels of a computing process may be the same or similar to protection levels (e.g., processor protection rings) and may indicate an access level of a computing process to hardware resources (e.g., virtual or physical resources). There may be multiple different privilege levels assigned to the computing process. In one example, the privilege levels may correspond generally to either a kernel privilege level or a user space privilege level. The user space privilege level may enable a computing process to access resources assigned to the computing process but may restrict access to resources assigned to another user space or kernel space computing process. The kernel space privilege level may enable a computing process to access resources assigned to other kernel space or user space computing processes. In another example, there may be a plurality of privilege levels, and the privilege levels may include a first level (e.g., ring 0) associated with a kernel, a second and third level (e.g., ring 1-2) associated with device drivers, and a fourth level (e.g., ring 3) that may be associated with user applications. As shown in FIG. 1, guest operating system 132 may manage multiple computing processes as shown by user space processes 134A-C.

User space processes 134A-C may be computing processes that are associated with user space privileges. A user space process (e.g., user mode process, user privilege process) may have diminished privileges that provide the user space process access to a user space portion of guest data storage 136 without having access to a kernel space portion of guest data storage 136. In contrast, a kernel process may have enhanced privileges that provide the kernel process access to the user space portion and a kernel space portion of guest data storage 136. In one example, each of the user space processes 134A-C may be an application process, a system process, a background process (e.g., daemon or service), or a combination thereof. In one example, the privilege associated with a user space process may change during execution and a computing process executing in user space (e.g., user mode, user land) may be granted enhanced privileges by the guest operating system and function in kernel space (e.g., kernel mode, kernel land). This may enable a user space process to perform an operation with enhanced privileges. In another example, the privilege associated with a user space process may remain constant during execution and the user space process may request an operation be performed by another computing process that has enhanced privileges (e.g., operating in kernel space).

Data storage manager 135 may provide one or more of the user space processes 134A-C with access to portions of guest data storage 136. Data storage manager 135 may organize and configure guest data storage 136 into one or more storage units 138A-C. The storage units 138A-C may be selected to correspond to hardware resources 110 and may be capable of storing resource requests 139A-C for one or more of hardware resources 110. User space processes that are able to modify a storage unit may be capable of providing resource requests to be processed by the corresponding hardware resource. Data storage manager 135 may therefor enable guest operating system 132 to control which of the user space processes 134A-C have access to which hardware resources 110 by providing particular user space processes with access to particular storage units. Data storage manager 135 may execute as part of a kernel, driver, application, other computer program, or a combination thereof. In one example, data storage manager 135 may provide a user space process with access to a storage unit by mapping the storage unit into a storage address space of the user space process. In another example, data storage manager 135 may provide a user space process with access to a storage unit by modifying the permissions of the user space process, the storage unit, other object, or a combination thereof.

Storage units 138A-C may be logical or physical units of data storage for storing, organizing, or accessing data. A storage unit may include a contiguous or non-contiguous sequence of bytes or bits. In one example, a storage unit may be a virtual representation of underlying physical storage units, which may be referred to as physical storage blocks. Storage units 138A-C may have a unit size that is the same or different from a physical block size provided by an underlying hardware resource. The block size may be a fixed-size, such as a particular integer value (e.g., 4 KB, 4 MB, 1 GB) or may be a variable-size that varies within any range of integer values. Each of the storage units 138A-C may have the same block size or a different block size when compared to an adjacent storage unit. Storage units 138A-C may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, storage units 138A-C may be a memory segment and each memory segment may correspond to an individual memory page, multiple memory pages, or a portion of a memory page. In other examples, each of the storage units 138A-C may correspond to a portion (e.g., block, sector) of a mass storage device (e.g., hard disk storage, solid state storage).

Each of the storage units 138A-C may correspond to a respective hardware resource of a set of hardware resources 110. In the example shown in FIG. 1, storage unit 138A may correspond to network interface device 112A, storage unit 138B may correspond to graphics device 112B, and storage unit 138C may correspond to storage device 112C. A single user space process may have access to one or more of the storage units 138A-C and may store a resource request in each of the respective storage units 138A-C. The user space process may use the resource request to provide a hardware operation to the hypervisor and subsequently to the hardware resource for execution. In one example, every resource request within a particular storage unit may correspond to a particular hardware resource (e.g., network interface device). In another example, a single storage unit may correspond to multiple different hardware resources (e.g., network interface device 112A and graphics device 112B).

Resource requests 139A-C may be generated by one or more computing processes and may include request data for a particular hardware resource. The request data may include operation data and payload data. The operation data may be any data that indicates or identifies one or more operations (e.g., computing instructions, functions, commands, or tasks) and the payload data may indicate or identify input data, output data, other data, or a combination thereof. Each of the resource requests 139A-C may be formatted in a manner that can be interpreted and processed by hypervisor 120, one or more hardware resources 110, other devices, or a combination thereof. The request data may cause the hardware resource to perform one or more computations that modify data, store data, transmit data, receive data, other computing action, or a combination thereof. In the example show in FIG. 1, there may be three different resource requests 139A-C and resource request 139A may include request data indicating a network operation for network interface device 112A, resource request 139B may include request data indicating a graphics operation for graphics device 112B, and resource request 139C may include request data indicating a storage operation for storage device 112C. One or more of the resource requests 139A-C may be analyzed and subsequently processed in response to signal 122.

Signal 122 may be initiated by guest code executed by virtual machine 130 and may cause hypervisor 120 to process one or more of the resource requests. The guest code (e.g., guest executable code) may include one or more guest operating systems, applications, drivers, other executable code, or a combination thereof. Signal 122 may be initiated guest code that is being executed by guest operating system 132, user space processes 134A-C, a kernel process, other executable code, or a combination thereof. In the example shown in FIG. 1, user space process 134A may initiate the transmission of signal 122 from virtual machine 130 to hypervisor 120. User space process 134A may initiate the signal transmission without involving the kernel of the guest operating system 132 and therefore may bypass the kernel and communicate directly with the hypervisor. In another example, the user space process 134A may initiate the transmission of signal 122 but the kernel may be involved with transmitting the signal 122 to hypervisor 120. In either example, signal 122 may cause a processing device of computing system 100 to switch from executing user space process 134A to executing hypervisor 120.

Signal 122 may be the result of a hypercall that is executed by a user space process of guest operating system 132. The hypercall may be a command (e.g., a CPU command or instruction) that causes an immediate switch from the guest executable code to the hypervisor when executed. The switch may occur without executing any guest kernel configurable security checks by the processor (e.g., CPU), which may enable the hypercall to be fast (e.g., less processing cycles) but less secure. The hypercall may vary depending on the underlying hardware architecture and its instruction set architecture (ISA) and may involve the execution of a VMCALL instruction on an Intel® processors, a VMMCALL instruction on AMD® processors, a HVC instruction on ARM® processors, or other instruction on another processor. The hypercall may be associated with a particular storage unit (e.g., 138A) and the storage unit may include one or more resource requests (e.g., 139A). The association of the hypercall with a storage unit is discussed in more detail below in regards to FIG. 2.

Network 140 may be a public network (e.g., the internet), a private network (e.g., a local area network (LAN), wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
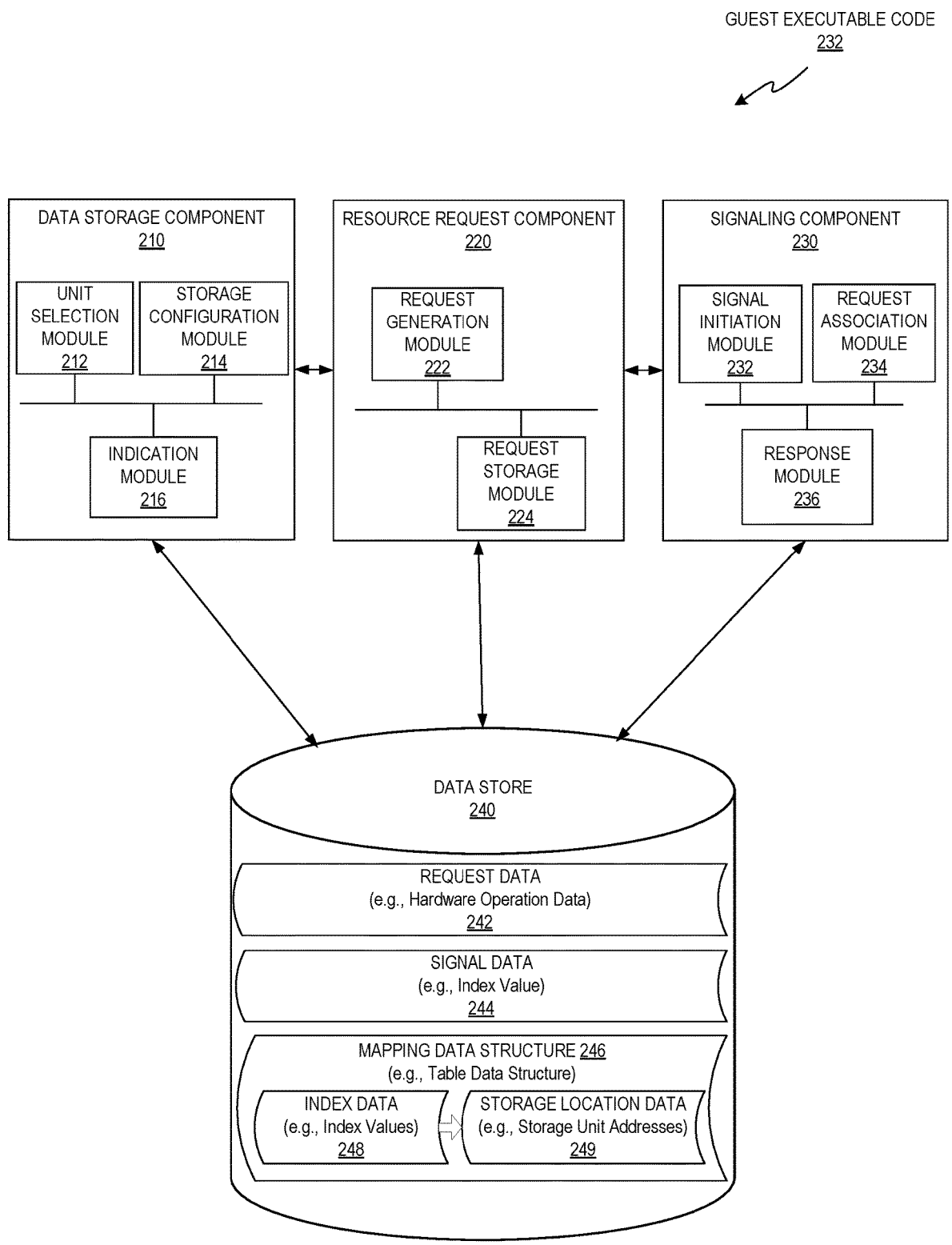
FIG. 2 depicts a block diagram illustrating components and modules of an example guest operating system, in accordance with one or more aspects of the present disclosure.

FIG. 2 is a block diagram illustrating example components and modules of guest executable code 232, in accordance with one or more aspects of the present disclosure. In the example shown, guest executable code 232 may include a data storage component 210, a resource request component 220, a signaling component 230, and access to a data store 240. The components and modules discussed herein may be performed by any portion of a virtual machine. For example, one or more of the components or modules discussed below may be performed by a guest kernel, a guest driver, a guest application, other portion of executable code, or a combination thereof. More or less components or modules may be included without loss of generality. For example, two or more of the components may be combined into a single component, or features of a component may be divided into two or more components. In one implementation, one or more of the components may reside on different computing devices (e.g., a client device and a server device).

Data storage component 210 may be the same or similar to data storage manager 135 and may enable guest executable code 232 to manage a guest data storage of the virtual machine. Data storage component 210 may segregate guest data storage into multiple portions referred to as storage units. In one example, the storage units may be portions of memory that include one or more memory pages, memory blocks, other unit, or a combination thereof. Data storage component 210 may designate portions of guest data storage as kernel space, user space, other privilege level, or a combination thereof. In one example, data storage component 210 may include a unit selection module 212, a storage configuration module 214, and an indication module 216.

Unit selection module 212 may identify portions of guest data storage and associate these portions with one or more storage units. Unit selection module 212 may create the storage units or the storage units may be previously generated by another portion of the guest operating system, a hypervisor, a hardware resource, or a combination thereof. The storage units may have any size and may be capable of storing one or more resource requests for the hardware resources. Each of the storage units may be accessible by a process executed by the guest operating system and by an underlying hypervisor. Unit selection module 212 may select one or more storage units to be associated with one or more hardware resources managed by a hypervisor. In one example, unit selection module 212 may select a particular storage unit and associated it with a particular hardware resource (e.g., a single hardware resource). In another example, unit selection module 212 may select a particular storage unit and associate it with multiple hardware resources. The multiple hardware resources may include all hardware resources managed by the hypervisor or a particular set of hardware resources managed by the hypervisor (e.g., subset of all hardware resources).

Storage configuration module 214 may configure the selected storage units to be modifiable by one or more user space processes managed by a guest operating system. As discussed above, each storage unit may correspond to a particular hardware resource and providing the user space process the ability to store resource requests may enable the user space process to cause the particular hardware resource to perform an operation. Storage configuration module 214 may control which user space processes have access to a hardware resource by enabling or disabling the user space processes ability to modify the respective storage unit. Storage configuration module 214 may enable or disable the ability of a user space process to modify a storage unit by either mapping the storage unit into a storage address space of the user space process or by modifying the permissions of the user space process, the storage unit, other object, or some combination thereof. In one example, the features of data storage component 210 may be provided by a kernel of the guest operating system and the kernel may determine whether a user space process can store resource requests at a storage unit to communicate operations to a hardware resource.

Indication module 216 may enable guest executable code 232 (e.g., kernel of guest operating system) to indicate to the hypervisor which storage units correspond to which hardware resources. The indication may include storage location data 249, index data 248, other data, or a combination thereof. Storage location data 249 may include one or more storage locations associated with a storage unit. The storage location may be a location in guest data storage that is accessible by the guest executable code and by the hypervisor. In one example, the storage unit may include a portion of guest memory and storage location data 249 may include one or more memory addresses within guest memory. The memory addresses may be physical addresses, virtual addresses, other addresses, or a combination thereof and may be associated with the beginning, end, or other location of a storage unit. In another example, the storage unit may include a portion of a mass storage device (e.g., secondary storage) and the storage location data 249 may include one or more identifiers of a file system object, database object, other object, or a combination thereof. The mass storage device may include a hard disk drive (HDD), a solid-state drive (SSD), other persistent data storage, or a combination thereof.

Index data 248 may correspond to a particular storage unit and to the respective hardware resource. The index data may include numeric or non-numeric values that are mapped to storage units. For example, index data 248 may include multiple integer values and each of the multiple integer values may correspond to a location of one of the storage units. Index data 248 is discussed in more detail below in regards to request association module 234. Portions of index data 248 and storage location data 249 may be stored in a mapping data structure 246.

Mapping data structure 246 may be any data structure that is capable of storing and organizing index data 248 and storage location data 249. Indication module 216 may enable guest executable code 232 to provide index data 248 and storage location data 249 to a hypervisor and the hypervisor may store some or all of the index data 248, storage location data 249, other data, or a combination thereof in mapping data structure 246. In one example, mapping data structure 246 may be accessible to hypervisor without being accessible to guest executable code 232. In another example, mapping data structure 246 may be accessible to the hypervisor and to guest executable code 232 and guest executable code 232 may or may not be able to modify mapping data structure 246. In either example, mapping data structure 246 may include one or more tables, two dimensional arrays, lists, links, other data structure, or a combination thereof.

The features discussed below in regards to unit selection module 212, storage configuration module 214, and indication module 216 may be executed by guest executable code 232 during a setup phase. The setup phase may occur at any point in time prior to an initiation of the signal (e.g., prior to execution of the hypercall) associated with a resource request. The setup phase may enable the guest executable code 232 to indicate, to the hypervisor, which storage units should be accessed or searched when a subsequent signal is received. In one example, the setup phase may occur before, during, or after an initialization of the virtual machine, the guest operating system, a user space process, or a combination thereof.

Resource request component 220 may enable guest executable code (e.g., user space process) to create resource requests to control the operations of one or more hardware resources. The resource requests may be stored by the guest executable code 232 and may be subsequently processed by the hypervisor managing the hardware resources. In one example, resource request component 220 may include a request generation module 222 and a request storage module 224. One or more features of resource request component 220 may be executed by a guest application, a guest driver, a guest kernel, a hypervisor, a hardware resource, or a combination thereof.

Request generation module 222 may enable the guest executable code (e.g. user space process) to generate a resource request. The resource request may include request data 242 for a particular hardware resource. Request data 242 may include operation data and payload data. The operation data may be any data that indicates or identifies one or more operations (e.g., computing instructions, functions, commands, or tasks) and the payload data may indicate or identify input data, output data, other data, or a combination thereof. Each resource request may be formatted in a manner that can be interpreted and processed by hypervisor 120, one or more hardware resources 110, other devices, or a combination thereof. Request data 242 may indicate which hardware resource will fulfill the request and provide the data necessary to cause the hardware resource to perform one or more computations that modify data, store data, transmit data, receive data, other computing action, or a combination thereof.

Request storage module 224 may identify a storage unit for the resource request and may cause a security check to ensure that the guest executable code (e.g., user space process) is authorized to modify the storage unit. Each resource request may correspond to one or more hardware resources and each hardware resource may correspond to a particular storage unit. Request storage module 224 may identify the hardware resource associated with a resource request and determine the corresponding storage unit. Request storage module 224 may then attempt to store the resource request at the identified storage unit. The attempt may cause one or more security checks to be performed, which may involve the guest kernel, the hypervisor, a hardware resource (e.g., CPU, memory controller, other processing device), other entity, or a combination thereof. The security checks may determine whether the user space process managed by the guest operating system is authorized (or unauthorized) to modify the storage unit. This security check may be advantageous because user space processes are traditionally un-privileged processes yet often need the ability to signal the hypervisor to cause hardware operations.

By storing the resource requests (e.g., hardware operation requests) in storage units, the security check native to a computing system can function to prohibit or authorize a user space process to cause a hardware resource to perform a particular hardware operation.

Signaling component 230 may enable guest executable code 232 to transmit a signal to the hypervisor that causes the resource request to be fulfilled. In one example, signaling component 230 may include a signal initiation module 232, a request association module 234, and a response module 236.

Signal initiation module 232 may enable a user space process managed by the guest operating system to bypass a kernel of the guest operating system and signal to the hypervisor that a resource request is stored and waiting to be processed. The signal may initiate a trap (e.g., hardware trap) that causes the processing device executing the user space process to switch from executing the guest executable code of the virtual machine to executing the hypervisor. The switch may be a context switch that transitions execution of the processing device from a guest user space process to a hypervisor process. In one example, the signal may be initiated by the user space process by executing a hypercall and be directly transmitted to the hypervisor without causing the guest kernel to execute. In another example, the signal may be initiated by the user space process and may be indirectly transmitted to the hypervisor. The indirect transmission may involve the user space process using a system call to communicate the signal to the guest kernel and the guest kernel communicating the signal to the hypervisor (e.g., via a hypercall). In either example, guest executable code 232 may associate the signal with a particular storage unit before, during, or after the initiation of the signal via request association module 234.

Request association module 234 may enable guest executable code 232 to associate a signal with a particular resource request generated by resource request component 220. The signal may be associated with signal data 244 that is used to identify a resource request. For example, signal data 244 may include a reference (e.g., storage address) of a storage unit that includes a resource request available for processing. Signal data 244 may be included internal to the signal, external to the signal, or a combination thereof. For example, a first portion of signal data 244 may be included within the signal and a second portion of signal data 244 may be stored at a specific storage field that the processing device or hypervisor checks in response to the signal. The specific storage field may include specific processor registers, memory blocks, mass storage objects (e.g., files, database records), storage units, other data storage location, or a combination thereof.

Signal data 244 may include data that a hypervisor can analyze to indirectly or directly identify the storage unit that has the resource request. Signal data 244 may directly identify the storage unit when signal data 244 includes data that a hypervisor can use to directly identify a particular storage unit (e.g., storage location data 249). Signal data 244 may indirectly identify the storage unit when signal data 244 includes data that a hypervisor can resolve to identify one or more storage units. The hypervisor may resolve the data using mapping data structure 246, which may include a mapping between index data 248 (e.g., index value) and a storage location data (e.g., storage unit address). For example, signal data 244 may include an index value and the hypervisor may access a portion of mapping data structure 246 that corresponds to the index value to determine the storage location of a storage unit.

As discussed above, the signal may be a hypercall and prior to executing the hypercall the guest executable code 232 (e.g., user space process) may update one or more of the specific fields (e.g., registers of the processing device). The hypercall may cause a trap (e.g., hardware trap) that switches the execution of the processing device from the guest executable code to the hypervisor. The hypervisor may respond to the trap by checking the one or more specific fields to determine that the trap was in response to a hypercall and to determine that the hypercall was a predefined type (e.g., wake hypercall). In response to the trap being associated with the predefined type of hypercall, the hypervisor may access another specific field that includes a portion of signal data 244 (e.g., an index value). The hypervisor may then resolve the signal data 244 to a particular storage unit using mapping data structure 246. The hypervisor may access the storage unit to retrieve and validate the resource request (e.g., check validation bit). Hypervisor may process the resource request by interpreting the request data to determine a hardware operation and cause a hardware resource to execute the operation in view of the resource request.

Response module 236 may enable the guest executable code 232 to detect an indication that the resource request was processed. A resource request may have been processed by the hypervisor, an emulated hardware resource, a physical hardware resource, or a combination thereof. The indication may include output data or a reference to output data stored at a location accessible by the guest executable code 232. In one example, the indication may involve modifying a verification portion (e.g., verification bit) of the resource request. The verification portion may be subsequently accessed (e.g., polled) to determine whether the resource request was processed. In another example, the indication may include a response signal initiated by the hypervisor. The response signal may be transmitted directly from the hypervisor to the user space process or transmitted indirectly to the user space process by first going to the kernel of the guest operating system, which may then inform the user space process that originated the resource request.

Figure 3:
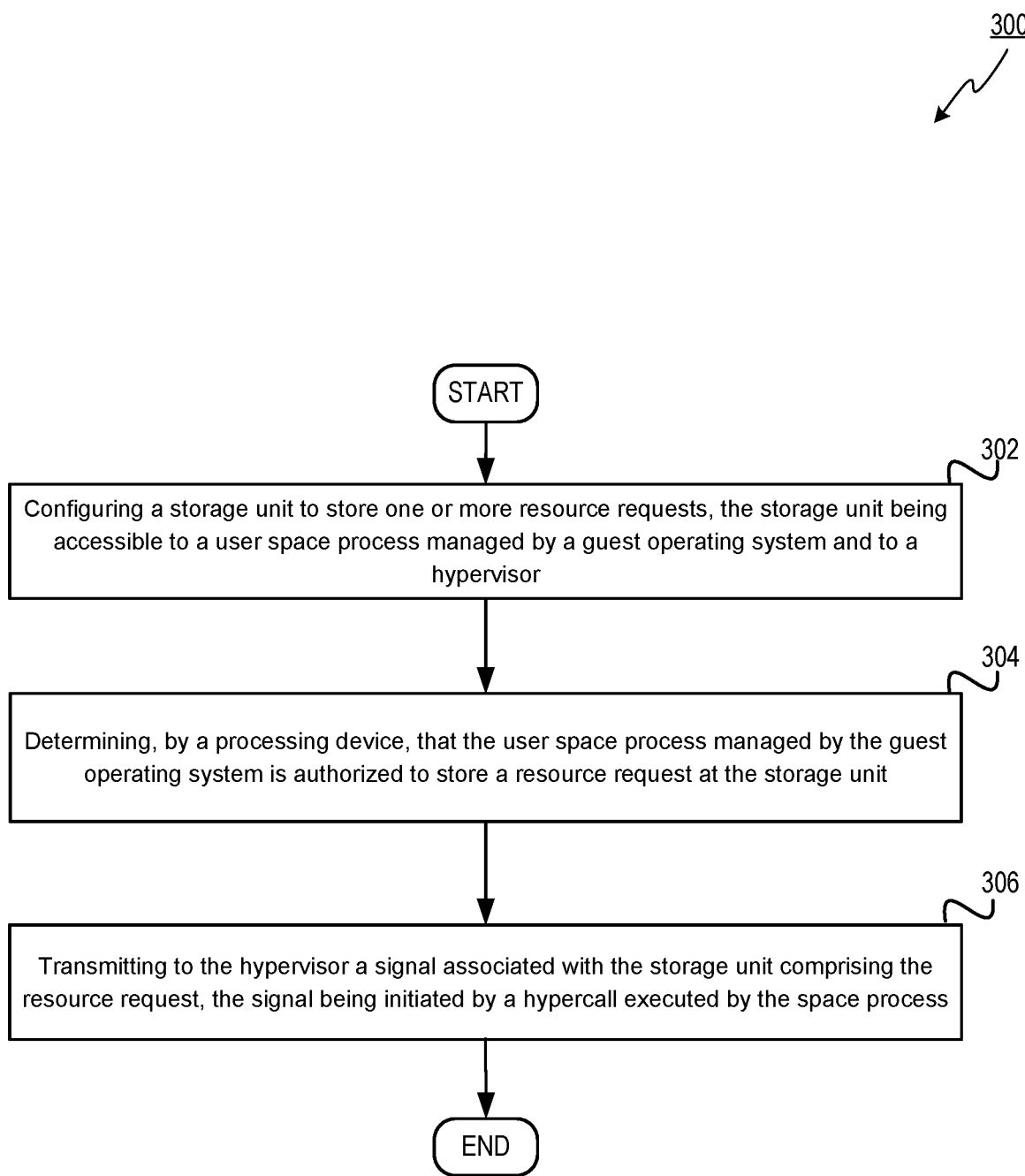
FIG. 3 depicts a flow diagram of an example method for enabling a guest user space process to communicate resource requests to the hypervisor in a security enhanced manner, in accordance with one or more aspects of the present disclosure.

FIG. 3 depicts a flow diagram of an illustrative example of a method 300 for security enhanced signaling between guest user space processes and an underlying hypervisor, in accordance with one or more aspects of the present disclosure. Method 300 and each of its individual functions, routines, subroutines, or operations may be performed by one or more processors of a computer device executing the method. In certain implementations, method 300 may be performed by a single processing thread of a guest operating system. Alternatively, methods 300 may be performed by two or more processing threads executing on the computer device and each thread may execute one or more individual functions, routines, subroutines, or operations of the method. In an illustrative example, the processing threads implementing methods 300 may be synchronized (e.g., using critical sections, semaphores, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by guest executable code 232 of FIG. 2 and may begin at block 302.

At block 302, a processing device executing a guest operating system may configure a storage unit to store one or more resource requests. The guest operating system may select a portion of guest data storage to be used as the storage unit. The storage unit may store the one or more resource requests at the selected portion of guest data storage. The one or more resource requests may each comprise an operation for a hardware resource managed by the hypervisor. The hardware resource may include a network interface device, a graphics device, a storage device, other physical or emulated device, or a combination thereof. In one example, the hardware resource managed by the hypervisor may include a hardware resource emulated by the hypervisor.

The storage unit may include a plurality of storage units corresponding to a set of hardware resources and each of the plurality of storage units may correspond to a particular hardware resource of the set of hardware resources. The storage units may be accessible to the guest operating system and to a hypervisor. The guest operating system may provide index data and storage location data of the storage units to the hypervisor. The index data and the storage location data may be stored in a table data structure accessible to the hypervisor. In one example, the storage units may include a portion of memory allocated to the guest operating system and configuring the storage unit may involve a kernel of the guest operating system providing a user space process with access to the portion of memory. The guest operating system may manage a plurality of user space processes and the configuration of the storage unit may involve the guest operating system providing at least one of the plurality of user space processes with access to store resource requests in one or more of the plurality of storage units.

At block 304, the processing device may determine that a user space process managed by the guest operating system is authorized to store a resource request at the storage unit. This may involve performing a security check to ensure that the user space process is authorized to modify the storage unit. The security check may involve actions by the guest kernel, the hypervisor, a hardware resource (e.g., CPU, memory controller, other processing device), other entity, or a combination thereof. The security check may be advantageous because user space processes are traditionally unprivileged processes yet often have the ability to signal the hypervisor to cause hardware operations. By storing the resource requests in storage units, the security check native to a computer system can function to authorize a user space process and to enable the user space process to cause a hardware resource to perform a particular hardware operation.

At block 306, the processing device may transmit to the hypervisor a signal that is associated with the storage unit including the resource request. The signal may be initiated by the user space process and may initiate a trap. The trap may cause the processing device to switch from executing the user space process to executing the hypervisor. In one example, transmitting the signal may involve the user space process executing a hypercall to cause a context switch from the guest executable code running on a virtual machine to the hypervisor. Before, during, or after initiating the hypercall, the processing device may update a storage field of the processing device to comprise data indicating that the hypercall is associated with the storage unit. The storage field may be a memory register of the processing device and the data may include an index value. The index value may correspond to a table entry indicating a storage address of the storage unit.

In an alternate example of method 300, the processing device may detect an indication that the resource request has been processed by the hypervisor. The indication may involve modifying a verification portion (e.g., verification bit) of the resource request. The verification portion may be subsequently accessed (e.g., polled) by the guest executable code (e.g., user space process) to determine whether the resource request was processed. In another example, the indication may involve a response signal transmitted to the guest operating system. In either example, the hypervisor may cause the guest executable code (e.g., guest operating system or user space process) to resume execution after the resource request is processed.

Figure 4:
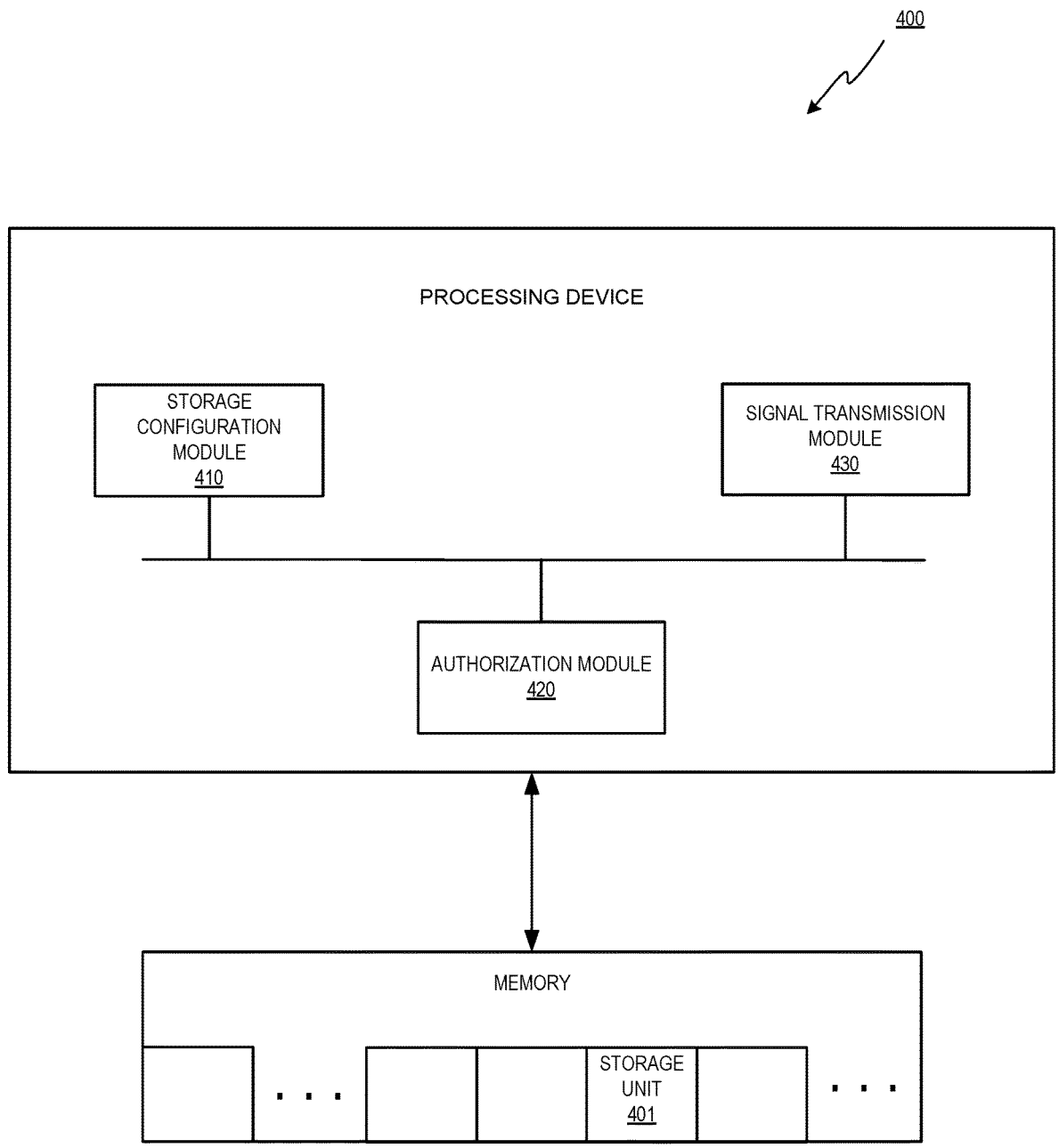
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computing system 100 of FIG. 1 and may include one or more processing devices and one or more memory devices. In the example shown, computer system 400 may include a storage configuration module 410, an authorization module 420, and a signal transmission module 430.

Storage configuration module 410 may enable a processing device executing a guest operating system to configure a storage unit 401 to store one or more resource requests. The guest operating system may select a portion of guest data storage to be used as storage unit 401. Storage unit 401 may store the one or more resource requests at the selected portion of guest data storage. The one or more resource requests may each comprise an operation for a hardware resource managed by the hypervisor. The hardware resource may include a network interface device, a graphics device, a storage device, other physical or emulated device, or a combination thereof. In one example, the hardware resource managed by the hypervisor may include a hardware resource emulated by the hypervisor.

Storage unit 401 may include a plurality of storage units corresponding to a set of hardware resources and each of the plurality of storage units may correspond to a particular hardware resource of the set of hardware resources. The storage units may be accessible to the guest operating system and to a hypervisor. The guest operating system may provide index data and storage location data of the storage units to the hypervisor. The index data and the storage location data may be stored in a table data structure accessible to the hypervisor. In one example, the storage units may include a portion of memory allocated to the virtual machine and managed by the guest operating system. Configuring the storage units may involve a kernel of the guest operating system providing a user space process with access to the portion of memory. The guest operating system may manage a plurality of user space processes and the configuration of the storage units may involve the guest operating system providing at least one of the plurality of user space processes with access to store resource requests in one or more of the plurality of storage units.

Authorization module 420 may enable a processing device to determine that a user space process managed by the guest operating system is authorized to store a resource request at storage unit 401. This may involve performing a security check to ensure that the user space process is authorized to modify storage unit 401. The security check may involve actions by the guest kernel, the hypervisor, a hardware resource (e.g., CPU, memory controller, other processing device), other entity, or a combination thereof. The security check may be advantageous because user space processes are traditionally un-privileged processes yet often have the ability to signal the hypervisor to cause hardware operations. By storing the resource requests in storage units, the security check native to a computer system can function to authorize a user space process and to enable the user space process to cause a hardware resource to perform a particular hardware operation.

Signal transmission module 430 may enable a processing device to transmit to the hypervisor a signal that is associated with storage unit 401 including the resource request. The signal may be initiated by the user space process by executing a hypercall. The hypercall may cause the processing device to switch from executing the user space process to executing the hypervisor. In one example, transmitting the signal cause a context switch from the guest executable code running on the virtual machine to the hypervisor. Before, during, or after initiating the hypercall, the processing device may update a storage field of the processing device to comprise data indicating that the hypercall is associated with storage unit 401. The storage field may be a memory register of the processing device and the data may include an index value. The index value may correspond to a table entry indicating a storage address of storage unit 401.

In an alternate example of system 400, there may be a detection module 440 that enables the processing device to detect an indication that the resource request has been processed by the hypervisor. In one example, the indication may involve modifying a verification portion (e.g., verification bit) of the resource request. The verification portion may be subsequently accessed (e.g., polled) by the guest operating system (e.g., user space process) to determine whether the resource request was processed. In another example, the indication may involve a response signal transmitted to the guest operating system. In either example, the hypervisor may cause the guest executable code (guest operating system or user space process) to resume execution after the resource request is processed.

Figure 5:
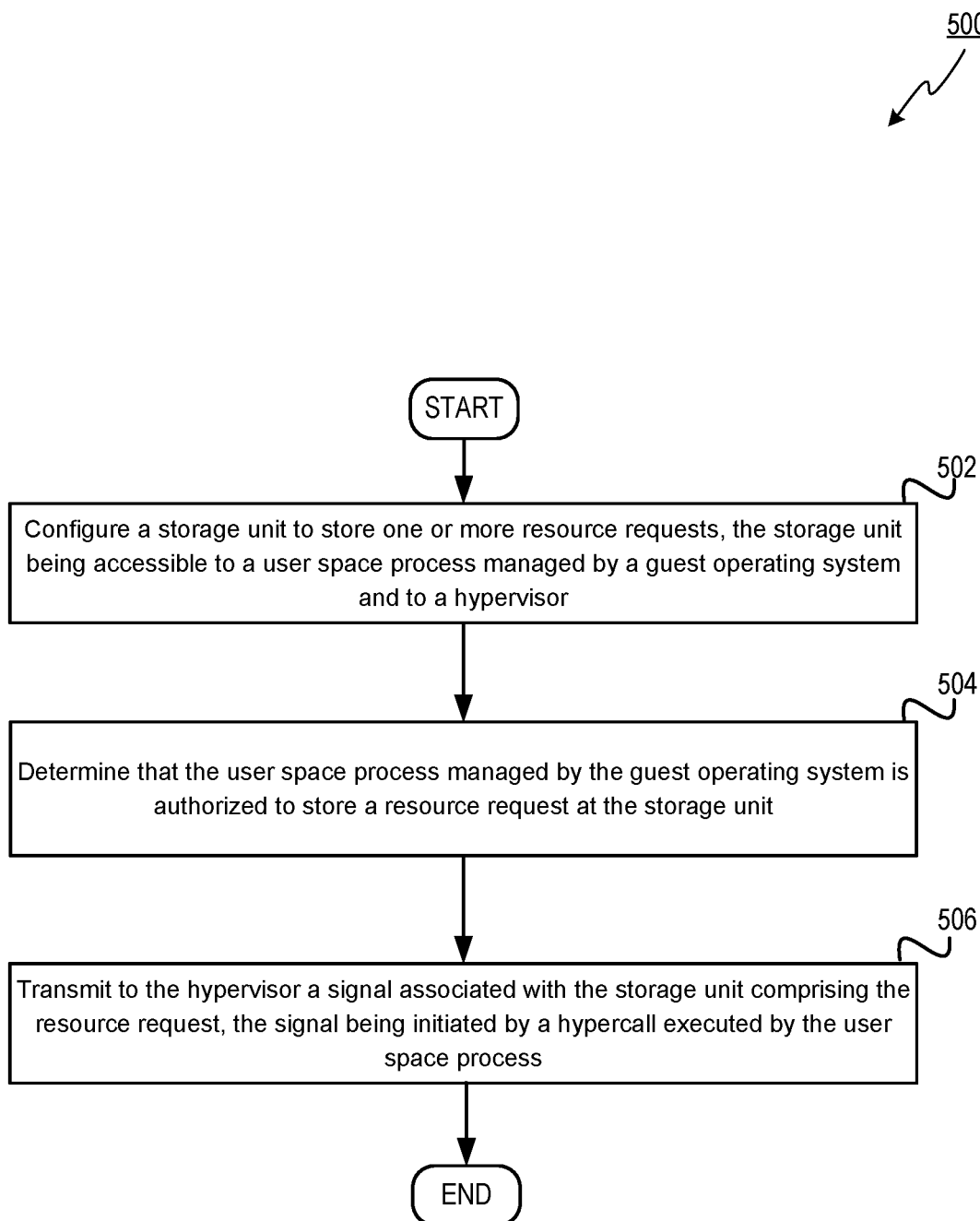
FIG. 5 depicts a flow diagram of an example method for enabling a hypervisor to receive resource requests from a user space process in a security enhanced manner, in accordance with one or more aspects of the present disclosure.

FIG. 5 depicts a flow diagram of an illustrative example of a method 500 for security enhanced signaling (e.g., hypercalls) between guest user space processes and an underlying hypervisor, in accordance with one or more aspects of the present disclosure. Method 500 may be similar to method 300 and may be performed in the same or a similar manner as described above in regards to FIG. 3. Method 500 may be performed by processing devices of a server device or a client device and may begin at block 502.

At block 502, a processing device executing a guest operating system may configure a storage unit to store one or more resource requests. The guest operating system may select a portion of guest data storage to be used as the storage unit. The storage unit may store the one or more resource requests at the selected portion of guest data storage. The one or more resource requests may each comprise an operation for a hardware resource managed by the hypervisor. The hardware resource may include a network interface device, a graphics device, a storage device, other physical or emulated device, or a combination thereof. In one example, the hardware resource managed by the hypervisor may include a hardware resource emulated by the hypervisor.

At block 504, the processing device may determine that a user space process managed by the guest operating system is authorized to store a resource request at a storage unit. This may involve causing a security check to be performed by the processing device to ensure that the user space process is authorized to modify the storage unit. The security check may involve actions by the guest kernel, the hypervisor, a hardware resource (e.g., CPU, memory controller, other processing device), other entity, or a combination thereof. The security check is advantageous since hypercalls may not have a hardware mechanism limiting a specific user space process to transmit signals associated with specific storage units. By limiting the userspace process to only store requests into specific storage units, it is possible to prevent a user space processes from initiating requests to prohibited resources.

At block 506, the processing device executing a virtual machine may transmit a signal that is associated with the storage unit that includes the resource request. The signal may be initiated by the user space process by executing a hypercall. The hypercall may cause the processing device to switch from executing the user space process to executing the hypervisor. In one example, transmitting the signal may cause a context switch from the guest executable code running on the virtual machine to the hypervisor. Before, during, or after initiating the hypercall, the processing device may update a storage field of the processing device to comprise data indicating that the hypercall is associated with the storage unit. The storage field may be a memory register of the processing device and the data may include an index value. The index value may correspond to a table entry indicating a storage address of the storage unit.

In one example of method 500, the processing device executing the hypervisor may process the resource request stored at the storage unit in response to the signal. The signal may cause a trap that switches the execution of the processing device from the guest executable code to the hypervisor. The hypervisor may respond to the hypervisor call by checking the one or more specific fields to determine that the hypercall was a predefined type (e.g., wake hypercall). In response to the hypercall being associated with the predefined type of hypercall, the hypervisor may access another specific field that includes a portion of signal data 244 (e.g., an index value). The hypervisor may then resolve the signal data 244 to a particular storage unit using mapping data structure 246. The hypervisor may access the storage unit to retrieve and validate the resource request (e.g., check validation bit). Hypervisor may process the resource request by interpreting the request data to determine a hardware operation and cause a hardware resource to execute the operation in view of the resource request.

The processing device executing the hypervisor may provide an indication to the guest operating system that the resource request was processed. In one example, the indication may involve modifying a verification portion (e.g., verification bit) of the resource request. The verification portion may be subsequently accessed (e.g., polled) by the guest operating system (e.g., user space process) to determine whether the resource request was processed. In another example, the indication may involve a response signal transmitted by the hypervisor to the guest operating system. In either example, the hypervisor may cause the guest operating system 132 to resume execution after the resource request is processed.

Figure 6:
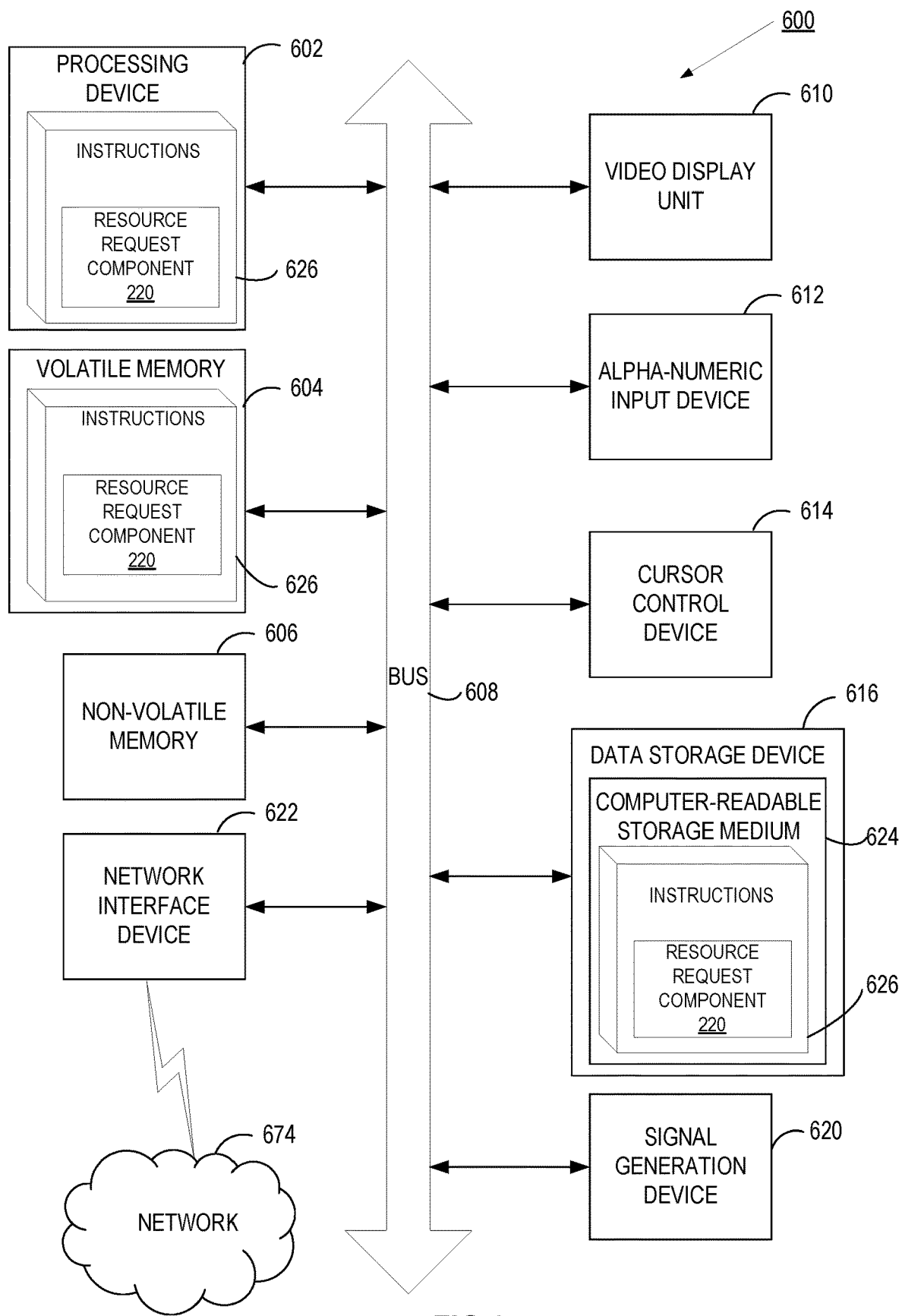
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computing system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for resource request component 222 of FIGS. 1 and 2.

Instructions 626 may also reside, completely or partially, within volatile memory 604 and/or within processing device 602 during execution thereof by computer system 600, hence, volatile memory 604, and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer and cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware resources. Further, the methods, components, and features may be implemented in any combination of hardware resources and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

configuring a storage unit to store resource requests of one or more user space processes, wherein the storage unit is accessible to a hypervisor and to a user space process managed by a guest operating system;

determining, by a processing device, that the user space process managed by the guest operating system is authorized to store a resource request at the storage unit; and receiving, by the hypervisor, a signal from the user space process, wherein the signal is associated with the storage unit and initiates execution of the resource request.

2. The method of claim 1, further comprising detecting an indication that the resource request has been processed by the hypervisor.

3. The method of claim 1, wherein the storage unit comprises a portion of memory managed by the guest operating system, and wherein configuring the storage unit comprises a kernel of the guest operating system providing the user space process access to the portion of memory.

4. The method of claim 1, wherein the resource requests each comprise an operation for a hardware resource managed by the hypervisor, the hardware resource comprising a network interface device, a graphics device, or a storage device.

5. The method of claim 1, wherein the storage unit comprises a plurality of storage units corresponding to a set of hardware resources, wherein each of the plurality of storage units corresponds to a particular hardware resource of the set of hardware resources.

6. The method of claim 5, wherein the guest operating system manages a plurality of user space processes and wherein configuring the storage unit comprises the guest operating system providing at least one of the plurality of user space processes with access to store resource requests in one or more of the plurality of storage units that correspond to the set of hardware resources.

7. The method of claim 1, further comprising:

selecting, by the guest operating system, a portion of a guest data storage for the storage unit to store the resource request; and providing index data and storage location data of the storage unit to the hypervisor, wherein the index data and the storage location data are stored in a table data structure accessible to the hypervisor.

8. The method of claim 1, wherein the signal causes the processing device to switch from executing the user space process to executing the hypervisor.

9. The method of claim 8, wherein receiving the signal further comprises, the user space process executing a hypercall that causes the signal by updating a storage field of the processing device to comprise data indicating that the hypercall is associated with the storage unit, wherein the storage field comprises a register of the processing device and the data comprises an index value corresponding to a table entry indicating a storage address of the storage unit.

10. A system comprising:

a memory;

a processing device operatively coupled to the memory, the processing device to:

configure a storage unit to store resource requests of one or more user space processes, wherein the storage unit is accessible to a hypervisor and to a user space process managed by a guest operating system;

determine, by the processing device, that the user space process managed by the guest operating system is authorized to store a resource request at the storage unit; and receiving, by the hypervisor, a signal from the user space process, wherein the signal is associated with the storage unit and initiates execution of the resource request.

11. The system of claim 10, wherein the storage unit comprises a portion of memory managed by the guest operating system, and wherein configuring the storage unit comprises a kernel of the guest operating system providing the user space process access to the portion of memory.

12. The system of claim 10, wherein the resource requests each comprise an operation for a hardware resource managed by the hypervisor, the hardware resource comprising a network interface device, a graphics device, or a storage device.

13. The system of claim 10, wherein the storage unit comprises a plurality of storage units corresponding to a set of hardware resources, wherein each of the plurality of storage units corresponds to a particular hardware resource of the set of hardware resources.

14. The system of claim 13, wherein the guest operating system manages a plurality of user space processes and wherein configuring the storage unit comprises the guest operating system providing at least one of the plurality of user space processes with access to store resource requests in one or more of the plurality of storage units that correspond to the set of hardware resources.

15. A non-transitory machine-readable storage medium storing instructions that cause a processing device executing a hypervisor to:

configure a storage unit to store resource requests of one or more user space processes, wherein the storage unit is accessible to a hypervisor and to a user space process managed by a guest operating system;

determine, by the processing device, that the user space process managed by the guest operating system is authorized to store a resource request at the storage unit; and receive, by the hypervisor, a signal from the user space process, wherein the signal is associated with the storage unit and initiates execution of the resource request.

16. The non-transitory machine-readable storage medium of claim 15, wherein the storage unit comprises a portion of memory managed by the guest operating system.

17. The non-transitory machine-readable storage medium of claim 15, wherein the resource request comprises an operation for a hardware resource managed by the hypervisor, the hardware resource comprising a network interface device, a graphics device, or a storage device.

18. The non-transitory machine-readable storage medium of claim 15, wherein the storage unit comprises a plurality of storage units corresponding to a set of hardware resources, wherein each of the plurality of storage units corresponds to a particular hardware resource of the set of hardware resources.

19. The non-transitory machine-readable storage medium of claim 15, wherein the signal causes the processing device to switch from executing the user space process to executing the hypervisor.

20. The non-transitory machine-readable storage medium of claim 15, wherein the signal causes a context switch to the hypervisor.

* * * * *